United States Patent
Niu

(10) Patent No.: US 10,202,062 B2
(45) Date of Patent: Feb. 12, 2019

(54) WINCH WITH AN ANTI-LOCKING STRUCTURE

(71) Applicant: Shengliang Niu, Taizhou (CN)

(72) Inventor: Shengliang Niu, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 394 days.

(21) Appl. No.: 15/141,770

(22) Filed: Apr. 28, 2016

(65) Prior Publication Data
US 2016/0318436 A1    Nov. 3, 2016

(30) Foreign Application Priority Data
Apr. 30, 2015    (CN) .......................... 2015 1 0218782

(51) Int. Cl.
*B60P 7/08* (2006.01)
*F16H 57/12* (2006.01)
*F16H 1/16* (2006.01)

(52) U.S. Cl.
CPC ............ *B60P 7/0846* (2013.01); *F16H 57/12* (2013.01); *F16H 1/16* (2013.01)

(58) Field of Classification Search
CPC ........ B60P 7/0846; B60P 7/083; F16H 57/12; F16H 1/16
See application file for complete search history.

(56) References Cited

U.S. PATENT DOCUMENTS

| 8,434,979 | B1* | 5/2013 | Genge | ..................... B60P 7/083 |
|---|---|---|---|---|
| | | | | 410/103 |
| 9,061,622 | B2* | 6/2015 | Knox | ...................... B60P 7/083 |
| 9,908,454 | B1* | 3/2018 | Waters, Jr. | ............ B60P 7/0846 |
| 2006/0180800 | A1* | 8/2006 | Tremblay | ................ B60P 7/083 |
| | | | | 254/229 |
| 2010/0166520 | A1* | 7/2010 | Ruan | ...................... B60P 7/083 |
| | | | | 410/103 |
| 2017/0058998 | A1* | 3/2017 | Bujold | ...................... F16H 1/16 |
| 2017/0232881 | A1* | 8/2017 | Thompson | ............ B60P 7/0823 |
| | | | | 254/229 |

FOREIGN PATENT DOCUMENTS

CN    200810120774.2    9/2008

* cited by examiner

*Primary Examiner* — Michael E Gallion
(74) *Attorney, Agent, or Firm* — Minder Law Group; Willy H. Wong

(57) ABSTRACT

A winch with an anti-locking structure comprises a support and a worm wheel, the two sides of the worm wheel are provided with a ring-shaped left positioning boss and a ring-shaped right positioning boss which protrude outward, the left positioning boss is sleeved with a left positioning sleeve, the right positioning boss is sleeved with a right positioning sleeve, and the outer circumferential surface of the left positioning boss is gaplessly sleeved with a circular hole wall of the left positioning sleeve, the outer circumferential surface of the left positioning sleeve is gaplessly sleeved with an inner hole of the case body, the outer circumferential surface of right positioning boss is gaplessly sleeved with a circular hole wall of the right positioning sleeve, the outer circumferential surface of the right positioning sleeve is gaplessly sleeved with the inner hole of the case body.

19 Claims, 6 Drawing Sheets

WINCH WITH AN ANTI-LOCKING STRUCTURE

RELATED APPLICATIONS

This application claims benefit to Chinese Patent Application No. CN201510218782.0, filed Apr. 30, 2015.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the technical field of machinery, and particularly to an anti-locking structure for a winch.

Related Art

When goods are being transported by a vehicle, usually the goods need to be bundled so that the goods are prevented from falling off when the vehicle is running, or being lost or damaged due to mutual collisions. The method in which ropes are used to directly bundle the goods is common, but this method is time-consuming and energy-consuming, and it is difficult to bundle the goods tightly. A winch is a bundling tool, and it is convenient and safe to use the winch to bundle the goods, therefore the winch is deeply welcomed by the majority of drivers.

One prior art winch is arranged at the winch support and is connected with a belt shaft of the winch; a control device comprises a case body fixed at the side of the winch support; a worm wheel and a worm which are meshed with each other are arranged in the case body; the worm wheel is connected to one end of the belt shaft and can rotate along with the belt shaft; the other end of the belt shaft extends out of the winch support; a driving mechanism capable of driving the worm to rotate is connected with the worm; when the driving mechanism is not operational, the worm can be driven to move in the axial direction by rotating the worm wheel so that the worm wheel is separated from the worm; the other end of the belt shaft is provided with an outer handle used for driving the belt wheel to rotate.

The winch with this kind of structure is compact in structure, small in space usage, and convenient to operate and use. However, the winch support is arranged on the body of a truck; the belt shaft is supported by two supporting parts on the support; one end of the belt shaft is a spline and is connected through the spline with the worm wheel, the worm wheel is incapable of effective positioning; the ride is likely to be bumpy when the truck is running, which leads to vibration of the belt shaft of the winch; when the vibration of the belt shaft is great, due to the combination with the spline, the worm wheel will vibrate along with the belt shaft so that the worm wheel deviates from its original position, and the worm wheel cannot be meshed with the worm normally; as a result, the worm wheel and the worm are locked, and the winch cannot work normally.

SUMMARY OF THE INVENTION

One objective of a preferred embodiment of the invention provides a winch with an anti-locking structure to solve the locking problem in the prior art.

One objective of a preferred embodiment of the invention can be achieved through the following technical scheme: the winch with the anti-locking structure comprises a support; the side of the support is fixedly connected with a case body; a worm wheel and a worm which are meshed with each other are arranged in the case body; the worm is fixedly connected to the inside of the case body. The winch with the anti-locking structure is characterized in that a belt shaft is arranged in the support, and one end of the belt shaft is connected with the worm wheel; the two sides of the worm wheel are provided with a ring-shaped left positioning boss and a ring-shaped right positioning boss which protrude outward; the left positioning boss is sleeved with a left positioning sleeve; the right positioning boss is sleeved with a right positioning sleeve; the inner hole of the left positioning sleeve is a circular hole, and the outer circumferential surface of the left positioning boss is gaplessly sleeved with the hole wall of the left positioning sleeve; the outer circumferential surface of the left positioning sleeve is gaplessly sleeved with the inner hole of the case body; the outer circumferential surface of the right positioning boss is gaplessly sleeved with the hole wall of the right positioning sleeve; the outer circumferential surface of the right positioning sleeve is gaplessly sleeved with the inner hole of the case body.

The left positioning boss and the right positioning boss at the two sides of the worm wheel are sleeved with the left positioning sleeve and the right positioning sleeve respectively, and support the left positioning sleeve and the right positioning sleeve; the outer circumferential surfaces of the left positioning sleeve and the right positioning sleeve are gaplessly sleeved with the inner holes of the case body so that the worm wheel is fixed inside the case body; when the belt shaft vibrates and deviates due to bumpiness, due to the fact that the left positioning sleeve and the right positioning sleeve are arranged, the force by which the vibration of the belt shaft drives the worm wheel to deviate is exerted onto the left positioning sleeve and the right positioning sleeve, and then is transferred to the case body; the outer circumferential surfaces of the left positioning sleeve and the right positioning sleeve are of the annular structure so it is guaranteed that the force deviating the worm wheel can be transferred to the case body all the time, therefore the displacement force exerted onto the worm wheel by the belt shaft is reduced, and the influence on the worm wheel and the worm due to the deformation of the belt shaft is eliminated; the relative positions of the worm wheel and the worm in the case body remain unchanged, so that the worm wheel can still be meshed with the worm normally, and the winch will not be locked.

In the above anti-locking structure for the winch, the outer end face of the left positioning sleeve is provided with a protruding annular blocking edge; the outer diameter of the annular blocking edge is smaller than the outer diameter of the left positioning sleeve; a left cover plate is fixedly connected to one side of the case body; the outer circumferential surface of the annular blocking edge is gaplessly sleeved with the inner hole of the left cover plate. The left cover plate is fixedly connected to one side of the case body to form a whole body with the case body; by arranging the annular blocking edge, the force generated by the deviation of the worm wheel is better transferred to the case body by the left positioning sleeve, and the influence on the worm wheel and the worm caused by the fact that the belt shaft is deformed due to the vibration is eliminated; therefore, the worm wheel can still be meshed with the worm normally, and the winch will not be locked.

In the above anti-locking structure for the winch, the belt shaft is provided with an annular protruding shoulder which protrudes outward; the protruding shoulder is gaplessly sleeved with the inner hole of the left positioning sleeve; the support is U-shaped, and a first through hole and a second through hole are formed in the support; the belt shaft penetrates through the first through hole and the second through hole, and is gaplessly sleeved with the inner walls of the first through hole and the second through hole respectively; the protruding shoulder is close to the second through hole. The belt shaft is supported at three points by the U-shaped support and the left positioning sleeve, and the rigidity of the belt shaft is strengthened due to the fact that the protruding shoulder protrudes outward so that the belt shaft is unlikely to deform. Moreover, the rigidity of the belt shaft at this end can also be increased as the protruding shoulder is close to the second through hole; when the belt shaft is deformed when being stressed, due to the fact that this end is supported by both the protruding shoulder and the second through hole within a short distance, the belt shaft is unlikely to deform, so it is guaranteed that the belt shaft transfers the force to the case body and the support rather than the worm wheel.

In the above anti-locking structure for the winch, the position at the second through hole in the support is provided with a positioning groove; the annular blocking edge is inserted into the positioning groove. By adopting this structure, the acting force is jointly supported by the case body and the support.

In the above anti-locking structure for the winch, the outer end face of the right positioning sleeve is provided with a circular blocking plate which protrudes outward; a right cover plate is fixedly connected to the other side of the case body; the outer diameter of the annular blocking edge is smaller than the outer diameter of the left positioning sleeve; the outer circumferential surface of the annular blocking edge is gaplessly sleeved with the circumferential surface of the inner hole of the right cover plate. The right cover plate is fixedly connected to the other side of the case body to form a whole body with the case body; by arranging the circular blocking plate, the force generated by the deviation of the worm wheel is better transferred to the case body by the right positioning sleeve, and the influence on the worm wheel and the worm caused by the fact that the belt shaft is deformed due to the vibration is eliminated; therefore, the worm wheel can still be meshed with the worm normally, and the winch will not be locked. In addition, the outer end face of the circular blocking plate is essentially flush with the outer end face of the right cover plate so that the other side of the case body is flat.

In the above anti-locking structure for the winch, the inner end face of the left positioning sleeve is provided with a left spacer ring which protrudes in the axial direction of the belt shaft; the inner end face of the right positioning sleeve is provided with a right spacer ring which protrudes in the axial direction of the belt shaft; the worm wheel is positioned between the left spacer ring and the right spacer ring.

In the above anti-locking structure for the winch, the thickness, in the axial direction of the belt shaft, of the left spacer ring is smaller than the thickness, in the axial direction of the belt shaft, of the left positioning sleeve; the outer diameter of the left spacer ring is smaller than the outer diameter of the left positioning sleeve; the thickness, in the axial direction of the belt shaft, of the right spacer ring is smaller than the thickness, in the axial direction of the belt shaft, of the right positioning sleeve; the outer diameter of the right spacer ring is smaller than the outer diameter of the right positioning sleeve. By arranging the left spacer ring and the right spacer ring, the contact area between the left positioning sleeve and the worm wheel is reduced, and the contact area between the right positioning sleeve and the worm wheel is reduced, which means the friction force between the worm wheel and the right positioning sleeve is lowered when rotating the worm wheel, therefore the worm wheel rotates smoothly and will not be locked, and the operation is labor-saving.

In the above anti-locking structure for the winch, a connecting hole is formed in the worm wheel; one end of the belt shaft is provided with a connecting part which is matched with the shape of the hole wall of the connecting hole, and the belt shaft is capable of driving the worm wheel to rotate; a gap is arranged between the connecting part and the side wall of the connecting hole. The gap is small, and the way that the belt shaft drives the worm wheel to rotate is unaffected by the gap; by arranging the gap, the deviation caused by the vibration of the belt shaft can be eliminated, and the influence on the worm wheel caused by the deviation of the belt shaft is reduced; therefore, the worm wheel can still be meshed with the worm normally, and the winch will not be locked.

In the above anti-locking structure for the winch, the connecting hole is formed in the worm wheel; one end of the belt shaft is provided with the connecting part which is matched with shape of the side wall of the connecting hole; the outer circumferential surface of the connecting part is gaplessly sleeved with the side wall of the connecting hole. Due to the fact that the force generated by the deviation of the belt shaft is finally transferred to the case body, or in another word, the fact that the connecting part is gaplessly sleeved with the side wall of the connecting hole does not affect how the worm wheel is meshed with the worm, and due to the fact that the connecting part is coupled with the hole wall of the connecting hole, the transmission effect between the belt shaft and the worm wheel is good.

In the above anti-locking structure for the winch, an outer handle is fixedly arranged at the other end of the belt shaft through screws; the outer handle is positioned outside the U-shaped support; the protruding shoulder is positioned outside the U-shaped support so as to prevent the belt shaft from moving in the axial direction.

Compared with the prior art, the anti-locking structure for the winch has the following advantages:
1. By arranging the left positioning sleeve and the right positioning sleeve on the anti-locking structure for the winch, the deviation of the worm wheel caused by the vibration of the belt shaft is transferred to the whole case body, and the influence on the worm wheel and the worm caused by the belt shaft due to the vibration is eliminated; therefore, the worm wheel can still be meshed with the worm normally, and the winch will not be locked.
2. In the anti-locking structure for the winch, the contact area between the left positioning sleeve and the worm wheel is small, and the contact area between the right positioning sleeve and the worm wheel is small, meaning that the friction force exerted on the worm wheel when rotating the worm wheel is low; therefore, the worm wheel rotates smoothly, and the winch will not be locked.

DETAILED DESCRIPTION OF THE INVENTION

Preferred embodiments of the present invention will be described below, and the technical scheme of the invention will be further illustrated in combination with the accompanying drawings. However, the invention is not limited to these embodiments.

Figure 1:
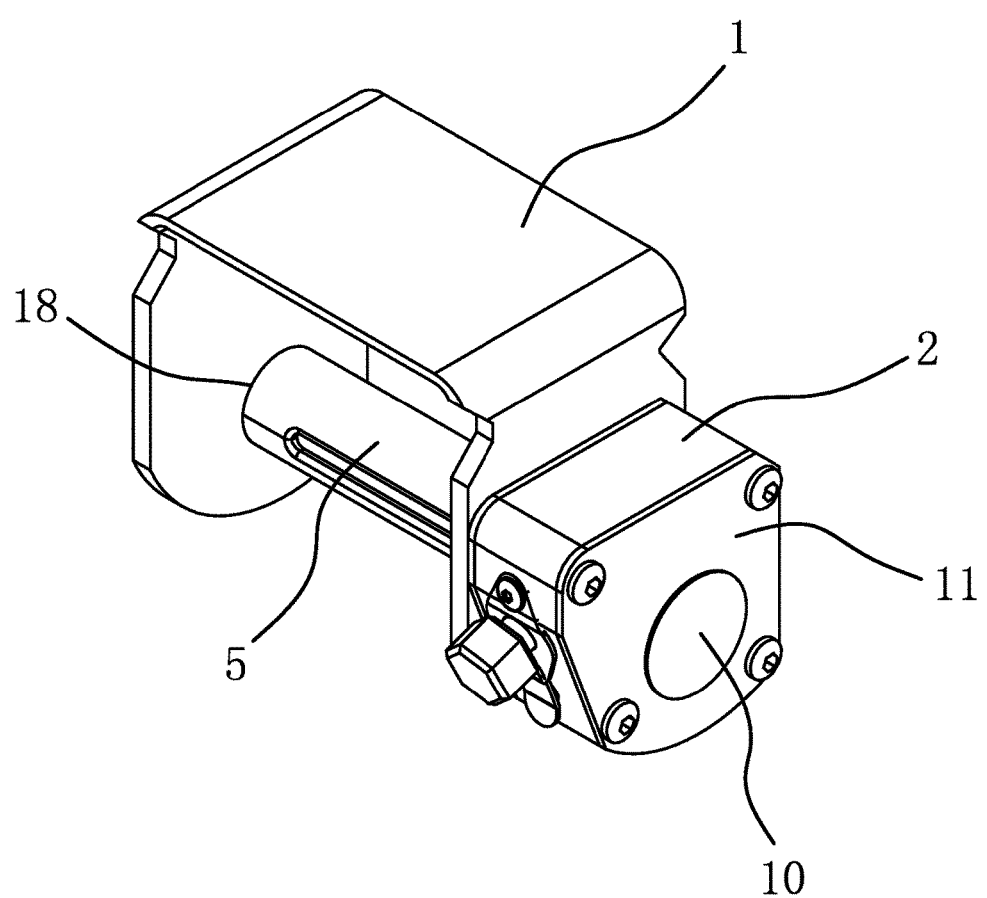
FIG. 1 is a perspective view of a preferred embodiment of the winch.
Figure 2:
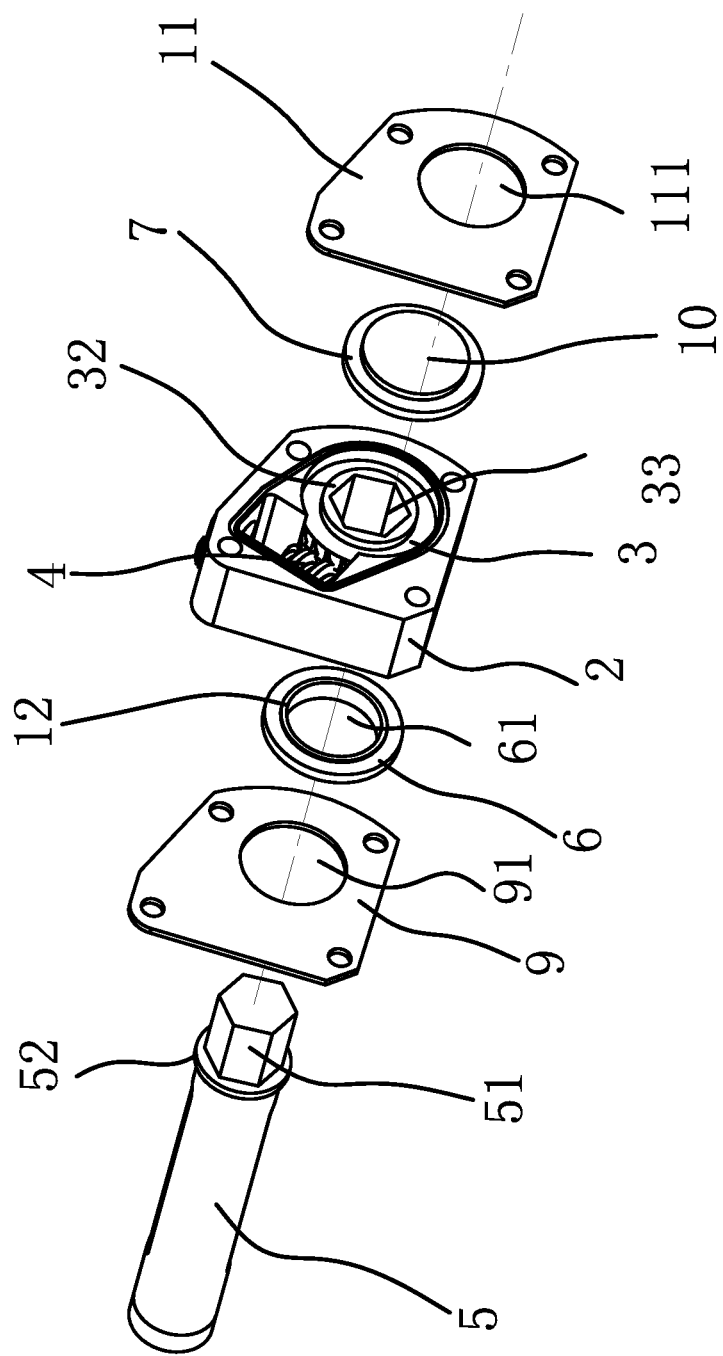
FIG. 2 is an exploded view of a portion of the winch.

As shown in FIGS. 1 and 2, the winch comprises the support 1, the case body 2, the worm wheel 3, the worm 4, and the belt shaft 5.

Figure 6:
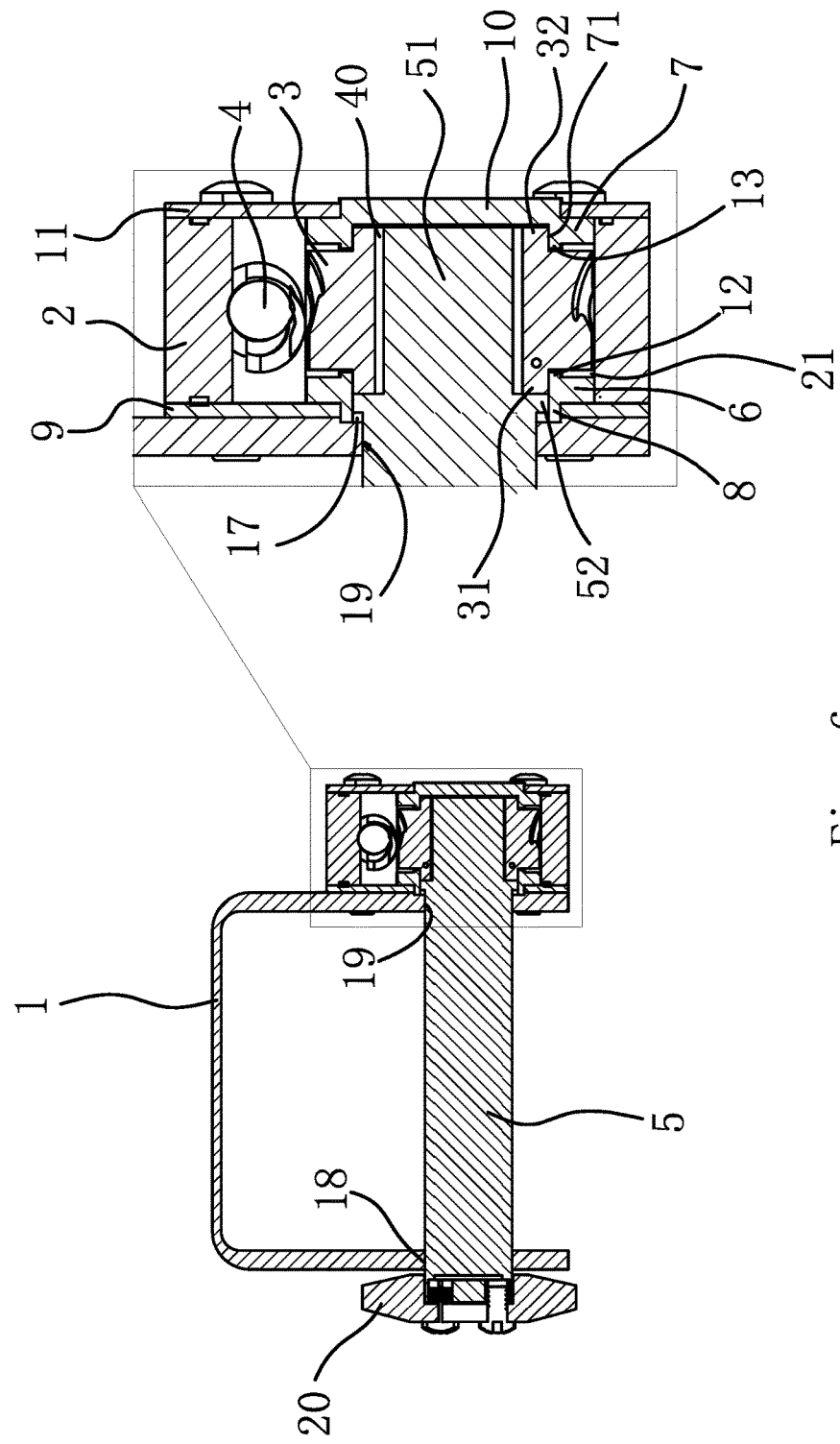
FIG. 6 is a sectional view of a preferred embodiment of the winch.

The support 1 is U-shaped; the belt shaft 5 is arranged in the support 1 in a penetrating mode; the case body 2 is fixedly connected to the side of the support 1; the left cover plate 9 is fixedly connected to one side of the case body 2; the right cover plate 11 is fixedly connected to the other side of the case body 2. The worm wheel 3 is meshed with the worm 4, and the connecting hole 33 is formed in the worm wheel 3. In this embodiment, the cross section, in the radial direction of the worm wheel 3, of the connecting hole 33 is in the shape of a regular hexagon, and during the actual production, the cross section can be in the shape of a square or a regular pentagon; the worm wheel 3 and the worm 4 are arranged in the case body 2; one end of the belt shaft 5 is the connecting part 51, and the shape of the connecting part 51 is matched with the shape of the side wall of the connecting hole 33; the connecting part 51 is in the shape of a regular hexagonal prism, and during the actual production, the connecting part 51 can be in the shape of a regular square prism or a regular pentagonal prism; the connecting part 51 of the belt shaft 5 penetrates through the support 1 and extends into the case body 2, and the connecting part 51 is arranged in the connecting hole 33 in a penetrating mode; as shown in FIG. 6, the gap 40 is arranged between the connecting part 51 and the hole wall of the connecting hole 33.

Figure 3:
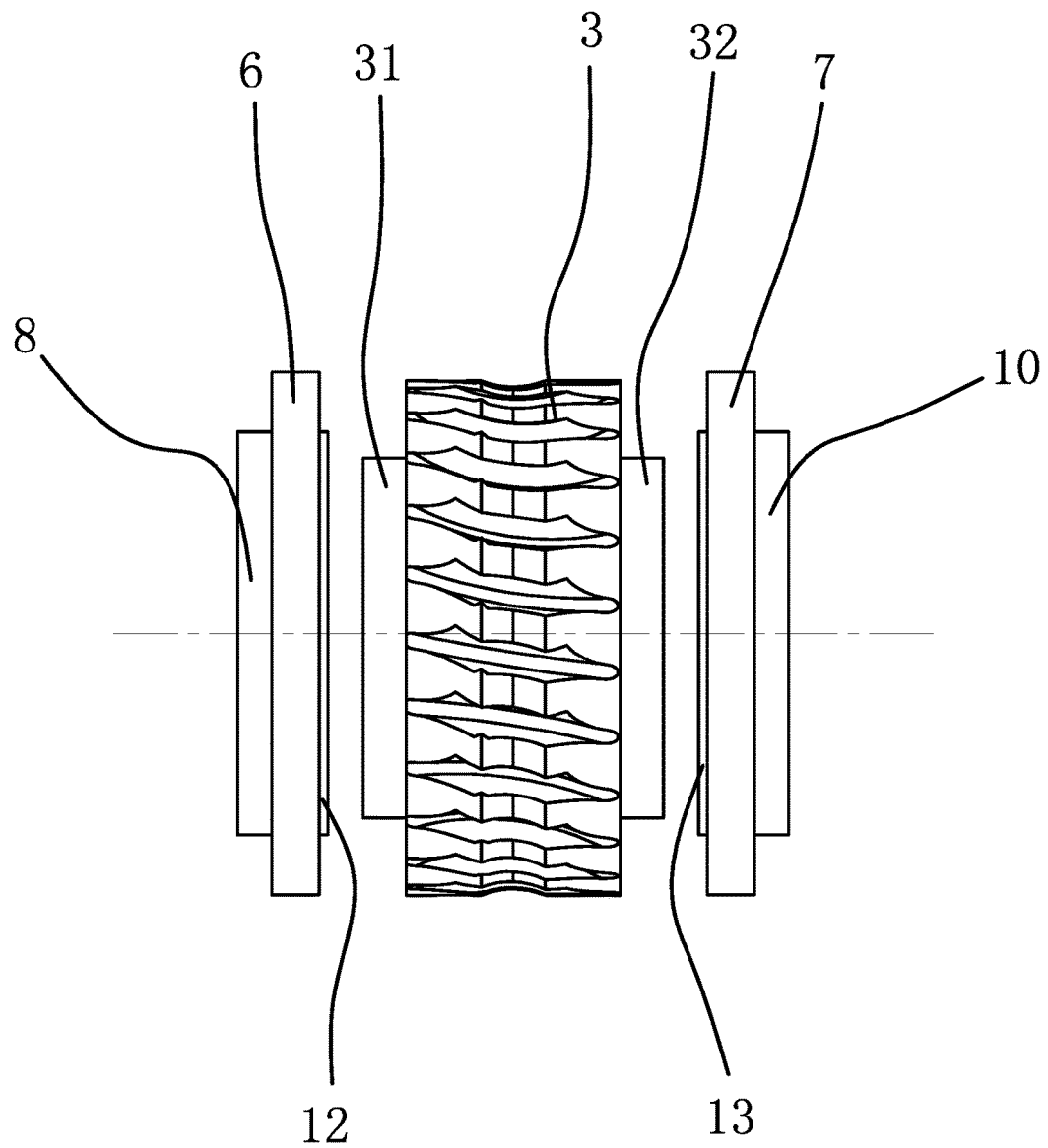
FIG. 3 is a front view of a preferred embodiment of the worm wheel, the left positioning sleeve, and the right positioning sleeve.
Figure 4:
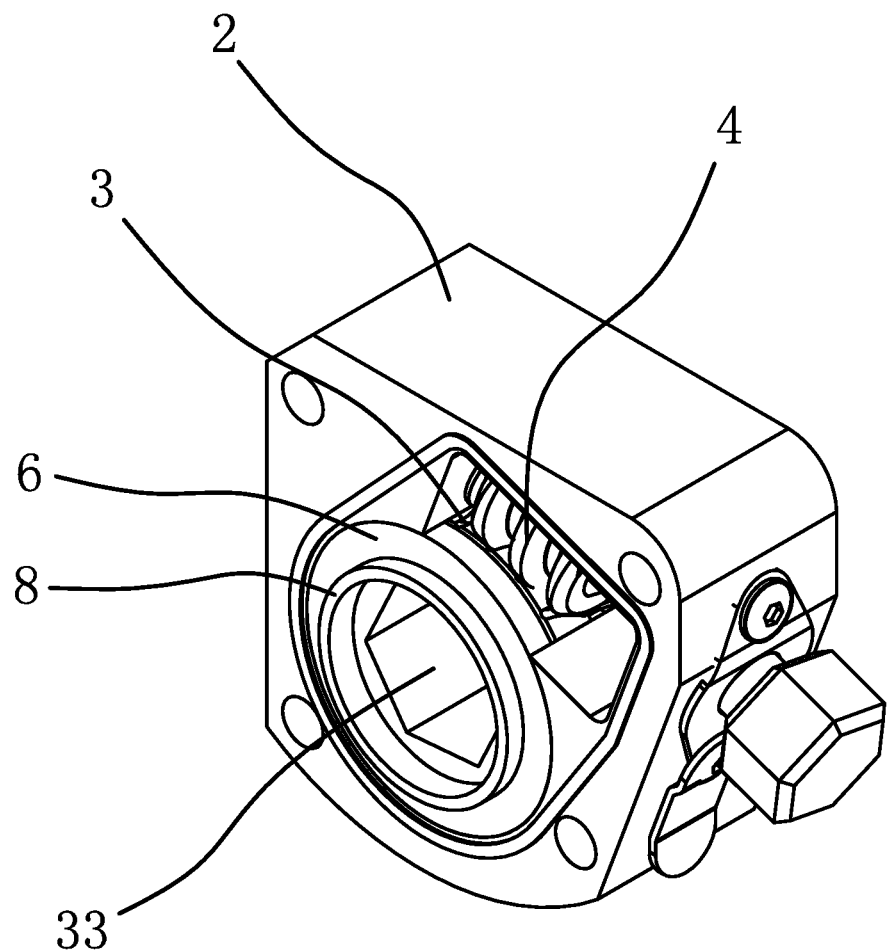
FIG. 4 is a first perspective view of a portion of a preferred embodiment of the anti-locking structure for the winch.
Figure 5:
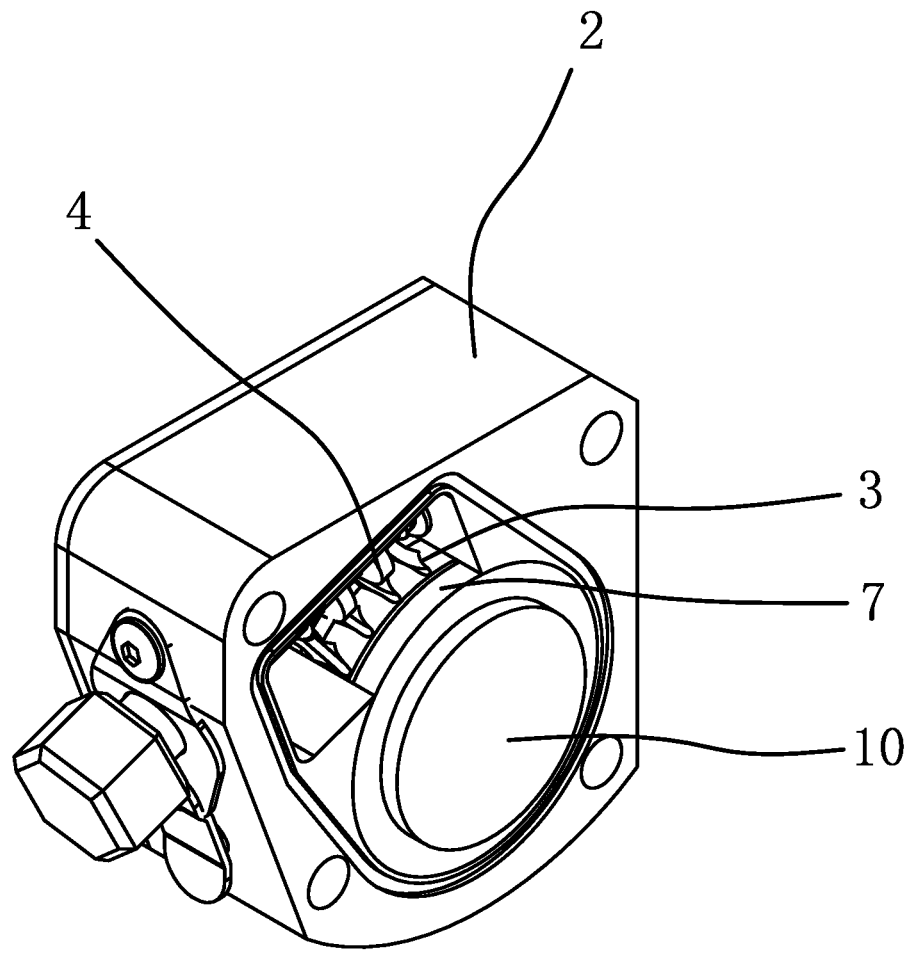
FIG. 5 is a second perspective view of a portion of a preferred embodiment of the winch.

As shown in FIGS. 3, 4, and 5, the anti-locking structure comprises the annular left positioning sleeve 6, the annular right positioning sleeve 7, the left positioning boss 31 and the right positioning boss 32, wherein the left positioning boss 31 and the right positioning boss 32 protrude out of the two sides of the worm wheel 3.

As shown in FIGS. 3 and 4, the left positioning boss 31 is sleeved with the left positioning sleeve 6; the outer circumferential surface of the left positioning boss 31 is gaplessly sleeved with the inner hole of the left positioning sleeve 6; the outer circumferential surface of the left positioning sleeve 6 is gaplessly sleeved with the inner hole of the case body 2; the outer end face of the left positioning sleeve 6 is provided with a protruding annular blocking edge 8; the outer diameter of the annular blocking edge 8 is smaller than the outer diameter of the left positioning sleeve 6; the outer circumferential surface of the annular blocking edge 8 is gaplessly sleeved with the circumferential surface of the inner hole of the left cover plate 9; the inner end face of the left positioning sleeve 6 is provided with the left spacer ring 12 which protrudes outward; the left spacer ring 12 is positioned between the left positioning sleeve 6 and the worm wheel 3; the outer diameter of the left spacer ring 12 is smaller than the outer diameter of the left positioning sleeve 6; the thickness, in the axial direction of the belt shaft 5, of the left spacer ring 12 is smaller than the thickness, in the axial direction of the belt shaft 5, of the left positioning sleeve 6.

As shown in FIGS. 3 and 5, the right positioning boss 32 is sleeved with the right positioning sleeve 7; the outer circumferential surface of the right positioning boss 32 is gaplessly sleeved with the hole wall of the right positioning sleeve 7; the outer circumferential surface of the right positioning sleeve 7 is gaplessly sleeved with the inner hole of the case body 2; the outer end face of the right positioning sleeve 7 is provided with the circular blocking plate 10 which protrudes outward; the outer diameter of the circular blocking plate 10 is smaller than the outer diameter of the right positioning sleeve 7; the outer circumferential surface of the circular blocking plate 10 is gaplessly sleeved with the inner hole of the right cover plate 11; the inner end face of the right positioning sleeve 7 is provided with the right spacer ring 13 which protrudes outward; the right spacer ring 13 is positioned between the right positioning sleeve 7 and the worm wheel 3; the outer diameter of the right spacer ring 13 is smaller than the outer diameter of the right positioning sleeve 7; the thickness, in the axial direction of the belt shaft 5, of the right spacer ring 13 is smaller than the thickness, in the axial direction of the belt shaft 5, of the right positioning sleeve 7.

As shown in FIG. 6, in order to increase the rigidity of the belt shaft 5 and to prevent the belt shaft 5 from affecting the worm wheel 3, the belt shaft 5 is provided with the annular protruding shoulder 52 which protrudes outward; the protruding shoulder 52 is gaplessly sleeved with the inner hole wall of the left positioning sleeve 6; the first through hole 18 and the second through hole 19 are formed in the support 1; the belt shaft 5 penetrates through the first through hole 18 and the second through hole 19, and is gaplessly sleeved with the inner walls of the first through hole 18 and the second through hole 19 respectively; the protruding shoulder 52 is close to the second through hole 19. The position at the second through hole 19 in the support 1 is provided with the positioning groove 17, and the annular blocking edge 8 is inserted into the positioning groove 17.

The outer handle 20 is fixedly arranged at the other end of the belt shaft 5 through screws; the outer handle 20 is positioned outside the U-shaped support 1; the protruding shoulder 52 is positioned outside the U-shaped support so as to prevent the belt shaft 5 from moving in the axial direction.

The winch is arranged on the truck, and the truck is bumpy during the ride, as a result, the belt shaft 5 vibrates, and the position of the belt shaft 5 deviates; the force generated by the deviation of the belt shaft 5 is transferred to the worm wheel 3; by arranging the left positioning boss 31 and the right positioning boss 32 at the two sides of the worm wheel 3, the force exerted onto the worm wheel 3 is transferred to the case body 2 through the left positioning sleeve 6 and the right positioning sleeve 7; the force is transferred to the left cover plate 9 through the annular blocking edge 8, and is finally transferred to the case body 2 through the left cover plate 9; the force is transferred to the right cover plate 11 through the circular blocking plate 10, and is finally transferred to the case body 2 through the right cover plate 11; in another word, the force generated by the deviation is completely transferred to the case body 2 in the end, so that the whole case body 2 deviates; therefore, the relative positions of the worm wheel 3 and the worm 4 in the case body 2 remain unchanged, the worm wheel 3 can still be meshed with the worm 4 normally, and the winch will not be locked.

The description of the preferred embodiments thereof serves only as an illustration of the spirit of the invention. Various modifications, or supplements, or adoption of similar methods as alternatives may be made therein by those skilled in the art without departing from the spirit of the invention or exceeding the scope defined in the appended claims.

LIST OF REFERENCE NUMERALS 1 support
2 case body
3 worm wheel
4 worm
5 belt shaft
6 left positioning sleeve
7 right positioning sleeve
8 annular blocking edge
9 left cover plate
10 circular blocking plate
11 right cover plate
12 left spacer ring
13 right spacer ring
17 positioning groove
18 first through hole
19 second through hole
20 outer handle
31 left positioning boss
32 right positioning boss
33 connecting hole
40 gap
51 connecting part
52 protruding shoulder

What is claimed is:

1. A winch with an anti-locking structure, comprising:
   a support (1), a side of the support (1) is fixedly connected with a case body (2);
   a worm wheel (3) and a worm (4) that are meshed with each other and are arranged in the case body (2), the worm (4) is fixed inside the case body (2);
   a belt shaft (5) is arranged in the support (1), an end of the belt shaft (5) is connected with the worm wheel (3);
   two sides of the worm wheel (3) that are provided with a ring-shaped left positioning boss (31) and a ring-shaped right positioning boss (32) that protrude outward, the left positioning boss (31) is sleeved with a left positioning sleeve (6), the right positioning boss (32) is sleeved with a right positioning sleeve (7);
   an inner hole (61) of the left positioning sleeve (6) that is a circular hole;
   an outer circumferential wall of left positioning boss (31) that is gaplessly sleeved with a hole wall of the inner hole (61) of the left positioning sleeve (6);
   an inner hole (21) of the case body (2) that is gaplessly sleeved with an outer circumferential surface of the left positioning sleeve (6);
   an inner hole (71) of the right positioning sleeve (7) that is a circular hole;
   an outer circumferential surface of right positioning boss (32) that is gaplessly sleeved with a hole wall of the right positioning sleeve (7); and
   a circumferential surface of the inner hole (21) of the case body (2) that is gaplessly sleeved with an outer circumferential surface of the right positioning sleeve (7).

2. The winch of claim 1, wherein an outer end face of the left positioning sleeve (6) is provided with a protruding annular blocking edge (8);
   wherein an outer diameter of the annular blocking edge (8) is smaller than an outer diameter of the left positioning sleeve (6);
   wherein a left cover plate (9) is fixedly connected to a side of the case body (2); and
   wherein an outer circumferential surface of the annular blocking edge (8) is gaplessly sleeved with a circumferential surface of an inner hole (91) of the left cover plate (9).

3. The winch of claim 1, wherein the belt shaft (5) is provided with an annular protruding shoulder (52) that protrudes outward;
   the protruding shoulder (52) is gaplessly sleeved with an inner hole (61) of the left positioning sleeve (6);
   wherein the support (1) is U-shaped, and a first through hole (18) and a second through hole (19) are formed in the support (1);
   the belt shaft (5) penetrates through the first through hole (18) and the second through hole (19), and is sleeved with inner walls of the first through hole (18) and the second through hole (19) respectively; and
   wherein the protruding shoulder (52) is close to the second through hole (19).

4. The winch of claim 3, wherein a position at the second through hole (19) in the support (1) is provided with a positioning groove (17); and
   wherein the annular blocking edge (8) is inserted into the positioning groove (17).

5. The winch of claim 1, wherein an outer end face of the right positioning sleeve (7) is provided with a protruding circular blocking plate (10);
   wherein an outer diameter of the circular blocking plate (10) is smaller than an outer diameter of the right positioning sleeve (7);
   wherein a right cover plate (11) is fixedly connected to a side of the case body (2);
   wherein an outer circumferential surface of the circular blocking plate (10) is sleeved with a circumferential surface of an inner hole (111) of the right cover plate (11).

6. The winch of claim 1, wherein an inner end face of the left positioning sleeve (6) is provided with a left spacer ring (12) that protrudes in an axial direction of the belt shaft (5);
   wherein an inner end face of the right positioning sleeve (7) is provided with a right spacer ring (13) that protrudes in an axial direction of the belt shaft (5); and
   wherein the worm wheel (3) is positioned between the left spacer ring (12) and the right spacer ring (13).

7. The winch of claim 6, wherein a thickness of the left spacer ring (12) in an axial direction of the belt shaft (5) is smaller than a thickness of the left positioning sleeve (6) in an axial direction of the belt shaft (5);
   wherein an outer diameter of the left spacer ring (12) is smaller than an outer diameter of the left positioning sleeve (6);
   wherein a thickness of the right spacer ring (13) in an axial direction of the belt shaft (5) is smaller than a thickness of the right positioning sleeve (7) in the axial direction of the belt shaft (5); and wherein an outer diameter of the right spacer ring (13) is smaller than an outer diameter of the right positioning sleeve (7).

8. The winch of claim 1, wherein a connecting hole (33) is formed in the worm wheel (3);
   wherein an end of the belt shaft (5) is provided with a connecting part (51) that is matched with a shape of a hole wall of the connecting hole (33), and the belt shaft (5) is capable of driving the worm wheel (3) to rotate; and
   wherein a gap (40) is arranged between the connecting part (51) and the hole wall of the connecting hole (33).

9. The winch of claim 8, wherein a cross section of the connecting hole (33) in a radial direction of the worm wheel (3) is in a shape of a regular polygon.

10. The winch of claim 1, wherein an outer handle (20) is fixedly arranged at an end of the belt shaft (5) through screws;
    wherein the outer handle (20) is positioned at an outer side of the U-shaped support (1); and
    wherein the protruding shoulder (52) is positioned outside the U-shaped support (1) so as to prevent the belt shaft (5) from moving in an axial direction.

11. The winch of claim 2, wherein an outer handle (20) is fixedly arranged at an end of the belt shaft (5) through screws;
    wherein the outer handle (20) is positioned at an outer side of the U-shaped support (1); and
    wherein the protruding shoulder (52) is positioned outside the U-shaped support (1) so as to prevent the belt shaft (5) from moving in an axial direction.

12. The winch of claim 5, wherein an outer handle (20) is fixedly arranged at an end of the belt shaft (5) through screws;
    wherein the outer handle (20) is positioned at an outer side of the U-shaped support (1); and
    wherein the protruding shoulder (52) is positioned outside the U-shaped support (1) so as to prevent the belt shaft (5) from moving in an axial direction.

13. The winch of claim 2, wherein the belt shaft (5) is provided with an annular protruding shoulder (52) that protrudes outward;
    the protruding shoulder (52) is gaplessly sleeved with an inner hole (61) of the left positioning sleeve (6);
    wherein the support (1) is U-shaped, and a first through hole (18) and a second through hole (19) are formed in the support (1);
    the belt shaft (5) penetrates through the first through hole (18) and the second through hole (19), and is sleeved with inner walls of the first through hole (18) and the second through hole (19) respectively; and
    wherein the protruding shoulder (52) is close to the second through hole (19).

14. The winch of claim 13, wherein a position at the second through hole (19) in the support (1) is provided with a positioning groove (17); and wherein the annular blocking edge (8) is inserted into the positioning groove (17).

15. The winch of claim 2, wherein an inner end face of the left positioning sleeve (6) is provided with a left spacer ring (12) that protrudes in the axial direction of the belt shaft (5);
    wherein an inner end face of the right positioning sleeve (7) is provided with a right spacer ring (13) that protrudes in an axial direction of the belt shaft (5); and
    wherein the worm wheel (3) is positioned between the left spacer ring (12) and the right spacer ring (13).

16. The winch of claim 5, wherein an inner end face of the left positioning sleeve (6) is provided with a left spacer ring (12) that protrudes in the axial direction of the belt shaft (5);
    wherein an inner end face of the right positioning sleeve (7) is provided with a right spacer ring (13) that protrudes in an axial direction of the belt shaft (5); and
    wherein the worm wheel (3) is positioned between the left spacer ring (12) and the right spacer ring (13).

17. The winch of claim 15, wherein a thickness of the left spacer ring (12) in an axial direction of the belt shaft (5) is smaller than a thickness of the left positioning sleeve (6) in an axial direction of the belt shaft (5);
    wherein an outer diameter of the left spacer ring (12) is smaller than an outer diameter of the left positioning sleeve (6);
    wherein a thickness of the right spacer ring (13) in an axial direction of the belt shaft (5) is smaller than a thickness of the right positioning sleeve (7) in the axial direction of the belt shaft (5); and
    wherein an outer diameter of the right spacer ring (13) is smaller than an outer diameter of the right positioning sleeve (7).

18. The winch of claim 16, wherein a thickness of the left spacer ring (12) in an axial direction of the belt shaft (5) is smaller than a thickness of the left positioning sleeve (6) in an axial direction of the belt shaft (5);
    wherein an outer diameter of the left spacer ring (12) is smaller than an outer diameter of the left positioning sleeve (6);
    wherein a thickness of the right spacer ring (13) in an axial direction of the belt shaft (5) is smaller than a thickness of the right positioning sleeve (7) in the axial direction of the belt shaft (5); and
    wherein an outer diameter of the right spacer ring (13) is smaller than an outer diameter of the right positioning sleeve (7).

19. The winch of claim 2, wherein a connecting hole (33) is formed in the worm wheel (3);
    wherein an end of the belt shaft (5) is provided with a connecting part (51) that is matched with a shape of a hole wall of the connecting hole (33), and the belt shaft (5) is capable of driving the worm wheel (3) to rotate; and
    wherein a gap (40) is arranged between the connecting part (51) and the hole wall of the connecting hole (33).

* * * * *